United States Patent
Gu et al.

(10) Patent No.: US 9,137,702 B2
(45) Date of Patent: Sep. 15, 2015

(54) METHODS AND DEVICES FOR MULTIPOINT TRANSMISSION

(75) Inventors: Xinyu Gu, Beijing (CN); Johan Hultell, Solna (SE); Qingyu Miao, Beijing (CN); Jinhua Liu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 642 days.

(21) Appl. No.: 13/383,617

(22) PCT Filed: Dec. 22, 2011

(86) PCT No.: PCT/SE2011/051571
§ 371 (c)(1),
(2), (4) Date: Jan. 31, 2012

(87) PCT Pub. No.: WO2012/099520
PCT Pub. Date: Jul. 26, 2012

(65) Prior Publication Data
US 2012/0190375 A1    Jul. 26, 2012

Related U.S. Application Data

(60) Provisional application No. 61/433,423, filed on Jan. 17, 2011.

(51) Int. Cl.
*H04W 4/00* (2009.01)
*H04W 28/02* (2009.01)
*H04B 7/02* (2006.01)
*H04W 36/00* (2009.01)
*H04W 72/00* (2009.01)
*H04M 3/00* (2006.01)

(52) U.S. Cl.
CPC .......... *H04W 28/0231* (2013.01); *H04B 7/024* (2013.01)

(58) Field of Classification Search
CPC . H04W 80/04; H04W 28/04; H04W 72/0446; H04W 36/30; H04W 72/84; H04W 24/00
USPC .......... 370/328, 329, 336; 455/436, 450, 418, 455/452.1
See application file for complete search history.

(56) References Cited

U.S. PATENT DOCUMENTS

| | | | |
|---|---|---|---|
| 2009/0318161 A1* | 12/2009 | Lopes | 455/453 |
| 2010/0027471 A1 | 2/2010 | Palanki et al. | |
| 2010/0173660 A1 | 7/2010 | Liu et al. | |
| 2010/0311349 A1* | 12/2010 | Koo et al. | 455/67.11 |

(Continued)

FOREIGN PATENT DOCUMENTS

| | | |
|---|---|---|
| EP | 2398155 A1 | 12/2011 |
| WO | 2006/116102 A2 | 11/2006 |

(Continued)

*Primary Examiner* — George Eng
*Assistant Examiner* — Muthuswamy Manoharan
(74) *Attorney, Agent, or Firm* — Murphy, Bilak & Homiller, PLLC (57) ABSTRACT

Methods and devices are provided whereby a cellular radio network, in particular a node in the network is configured to dynamically transmit data to UE from different cells while considering information that is not known to a central node, such as an RNC. This can in accordance with some embodiments be accomplished by decoupling the procedure of handling a set of cells form which simultaneous transmission of data to a UE can take place.

7 Claims, 8 Drawing Sheets

(56) References Cited

U.S. PATENT DOCUMENTS

2011/0237272 A1* 9/2011 Gorokhov et al. ......... 455/452.1
2011/0281585 A1* 11/2011 Kwon et al. ................. 455/436

FOREIGN PATENT DOCUMENTS

| WO | 2011/100673 A1 | 8/2011 |
|---|---|---|
| WO | 2012/019813 A1 | 2/2012 |

* cited by examiner

METHODS AND DEVICES FOR MULTIPOINT TRANSMISSION

TECHNICAL FIELD

The present disclosure relates to methods and devices for selecting cells for multipoint transmission.

BACKGROUND

High Speed Downlink Packet Access (HSDPA) multipoint transmission, in which multiple cells are capable to transmitting possibly different data to the same User Equipment (UE) simultaneously using the same frequency, was approved as a new study item (SI) at Third Generation Partnership Project (3GPP) RAN #50. Possible multipoint transmission methods that should be evaluated according to the SI include:
  Switched transmit diversity techniques (e.g., HS-DDTx)
  Multi-flow transmission techniques (e.g. SF-DC-HSDPA)
  Single frequency network transmissions (e.g. HS-SFN multipoint)

Furthermore, according to the SI both intra and inter-NodeB coordination are being considered. The following distinction between intra and inter-site coordination can be made:
  Intra-site coordination: All cells wherefrom data can be transmitted to a UE are controlled by one logical baseband unit. Note that the baseband unit can be implemented in a way so that its functionality is distributed across multiple cells (possibly at different location) but where direct communication between the different parts of the functionality is supported by means of, e.g., some proprietary interface. This means that information for the cells can be shared without involving a central node such as a Radio Network Controller (RNC).
  Inter-site coordination: Cells wherefrom data can be transmitted to a UE are controlled by multiple logical baseband units where the different baseband units only can share information with each other by means of sending it via a central node, such as an RNC.

Another practical example of intra-site scenario is Main Unit—Remote Radio Unit (MU-RRU) solutions in which multiple cells with antennas at different physical locations share base band unit.

For multi-point transmission techniques, transmission of data can take place from multiple different cells to one UE at the same time. The set of cells wherefrom transmission can take place is here referred to as a configured CoMP set. In case of intra-site coordination the baseband unit controlling the cells in the CoMP set can get information for all available cells without involving the central node such as an RNC. Amongst the cells in the CoMP set a logical entity can at a given time select a subset of the cells wherefrom actual transmission takes place. This will be referred to as a selection process, i.e. how to select the secondary High-Speed Downlink Shared Channel (HS-DSCH) serving cells, as CoMP set selection. This selection process results in a selected CoMP set.

It has been argued that the determination of the secondary serving HS-DSCH cell is linked to legacy mobility procedure. For example, the network may need to sort active set cells based on pilot strength measurements reported by the UE and determine the second strongest cell as the secondary serving HS-DSCH cell. Furthermore, depending on whether the network supports SF-DC-HSDPA (Single Frequency Dual Cell High Speed Downlink Packet Access) across non-co-located sectors, it may need to restrict the determination to cells that belong to the same NodeB as the serving HS-DSCH cell.

As noted above it has been proposed that existing mobility events are used for selecting the CoMP set. In this case the configured and selected CoMP set would be identical. Further if only the existing mobility events are (re)used for selecting the CoMP set this needs to be performed by the RNC (since mobility events are signaled via Radio Resource Control (RRC) between the UE and the RNC).

There is a constant demand to improve the performance of cellular radio systems.

Hence there exists a need for new methods and devices providing improved selection of CoMP set.

SUMMARY

It is an object of the present disclosure to provide an improved method and device to address the problems as outlined above.

This object and others are obtained by the methods and devices as described herein.

Existing methods for selecting the CoMP set may be inadequate because the load (available power and codes) across different cells may
  Vary considerably between different cells,
  Vary very quickly in time due the bursty nature of traffic.

Hence, the second strongest cell may be associated with a high load and thus only have little power and code resources available. Under such circumstances it would be better to use another cell. Hence, it would be beneficial to also exploit other measurements (e.g., load) which vary on a more dynamic time-basis when determining the selected CoMP set.

As existing events in some implementations are reported from the UE via Radio Resource Control (RRC) to the RNC one straightforward approach would be to have the RNC controlling the selected CoMP set (wherefrom data transmission can take place). However, the RNC is not aware of the current load in the different cells. Further, even if the RNC would be aware of the load information associated with a certain cell (e.g., signaled from the Node-B via a Iub interface) the delay between RNC and Node-Bs is typically so high so that the information would be outdated once the RNC has updated the selected CoMP set and reconfigured the UE.

Also, since the load associated with different cells can vary in a highly dynamic fashion, an approach where all cells report load information to the RNC would result in a considerable increase in the RNC load.

The inventors have realized that it would be beneficial to have a method in which additional information in addition to the pathgain information provided by the RRC mobility measurements can be used. Examples of such information include:
  The load associated with the different cells
  The variation in load (over time) associated with the different cells
  The maximum available transmit power (e.g., macro, micro, pico)
  Load on different carriers (in case of multi-carrier capable UE) and where transmissions from different Node-Bs to the same UE could take place on different frequencies.

In accordance with embodiments of the disclosure, methods and devices are provided whereby the network, in particular a node in the network is configured to dynamically transmit data to UE from different cells while considering information that is not known to the RNC. This can in accordance with some embodiments be accomplished by decoupling the procedure of handling a CoMP set (i.e. a set of cells form which transmission of data can take place one UE at the same time). The set of cells wherefrom transmission can take place into two separate subtasks:

The first step is composed by that the RNC configures a CoMP set. This is the set of CoMP cells that can be used for transmissions information to a single UE. Note that the CoMP set may span both the frequency and space domain (i.e. it can consist of multiple cells and/or multiple frequencies) and the set to the UE and a baseband unit(s) that controls the scheduling for the cells encompassed by the CoMP set. The configured CoMP set is updated based on measurement from the UE or the Node-B. One of cells in the configured CoMP set is the serving HS-DSCH.

The second step is composed by that the baseband unit dynamically decides which of the cells in the configured CoMP set that should be used for data transmissions. These cells can be referred to as secondary serving cells, such as HS-DSCH cell(s). Note that serving HS-DSCH is always active (i.e. monitored by the UE). The scheduled CoMP set can be updated without informing the RNC. This enables that information, that varies on a fast time-basis and which further is not known to the RNC is taken into consideration.

Criteria for prioritizing between the candidate cells in the configured CoMP set and methods whereby the Node-B can inform the UE which of the candidate cells that will serve as secondary serving HS-DSCH(s) cell are described further below.

Thus, in accordance with embodiments described herein a method in a cellular radio system network is provided where the network is configured for multipoint transmission. In the method multiple cells of the cellular radio system are capable of transmitting possibly different data to the same User Equipment, UE, simultaneously. The method comprises that the cellular radio network dynamically transmits data to a UE from different cells, where said different cells are a subset of a set of configured cell that can be used for data transmissions, said subset of cells being determined considering a set of information that is not known to a central node of the cellular radio network where the central node is adapted to configure the set of configured cells.

In accordance with some embodiments the central node is a radio network controller, RNC.

In accordance with some embodiments a baseband unit dynamically decides which of the cells of the configured set of cells that are to be used for data transmissions.

As set out above the set of information can comprise one or more of:
  The load associated with the different cells,
  The variation in load (over time) associated with the different cells,
  The maximum available transmit power, and
  Load on different carriers In accordance with some embodiments the baseband unit dynamically decides which of the cells of a configured set of cells that are to be used for data transmissions based on uplink radio quality and or downlink throughput.

In accordance with some embodiments a Node B signals the cells that are to be used for data transmissions to the user equipment.

In accordance with some embodiments the configured set of cells is determined in the central node and distributed to the base band unit.

In accordance with some embodiments the configured set of cells is signaled to the base band unit as a mapping between numbers and cells.

In accordance with some embodiments the configured set of cells is continuously updated.

Further, the configured set of cells (CoMP set) can be signaled as a mapping between a number and the cell. Also the, configured set of cells can continuously be updated for example using existing mobility measurements but maybe with a different threshold for managing the configured set of cells. In accordance with some embodiments to avoid an RNC congestion it is possible for the baseband unit, e.g. via the serving Node-B(s), to activate and deactivate reporting to the RNC associated with the maintenance of the configured set of cells.

By introducing the capability for the Node-B to dynamically activate and deactivate the RRC reporting associated with configured set of cells the baseband unit responsible for the cells in the configured set can
  Disable reports transmitted from the UE to the RNC regarding addition/deletion of new cells if the cells are characterized by high load conditions.
  Disable reports transmitted from the UE to the RNC regarding addition/deletion of new cells if the RNC is experiencing congestion. This may require that new signaling is introduced from the RNC to the baseband unit responsible handling the configured set of cells.

Further, in accordance with some embodiments a Node B can be configured to decide the cells of the configured set of cells that are to be used for data transmission to a UE based on uplink radio quality (UL DPCCH quality, reported CQI, uplink power headroom) and/or downlink throughput.

The disclosure also extends to nodes, such as a RNC and a radio base station Node-B, in a cellular radio system for performing the methods as described herein. The nodes can be provided with a controller/controller circuitry for performing the above processes. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present disclosure will now be described in more detail by way of non-limiting examples and with reference to the accompanying drawing, in which.

DETAILED DESCRIPTION

In accordance with embodiments described herein methods and devices are provided in the network whereby the network procedure of selecting one or multiple cells to schedule transmissions on is de-coupled. In particular the procedure can be decoupled into two steps:

Maintaining a configured CoMP set for each UE. The configured CoMP set is controlled by a central node such as an RNC.

Decide which of the cells in the configured CoMP set that should be used for scheduling data. This is controlled by baseband unit that controls scheduling for the cells in the configured CoMP set. The base band unit can typically be implemented using a scheduler entity in a radio base station NodeB. Note that as long as the scheduling occurs over the cells within the configured CoMP set this can be performed without informing the RNC.

In general, the first step ("maintaining the configured CoMP set") is performed on a relatively slow time-scale since it involves a central node such as an RNC. The second step ("selecting the CoMP set") is performed on a much faster time-scale and using the outcome of the first step as input data. Note also that the second step in the process is done in an autonomous fashion with respect to the first step.

Figure 1:
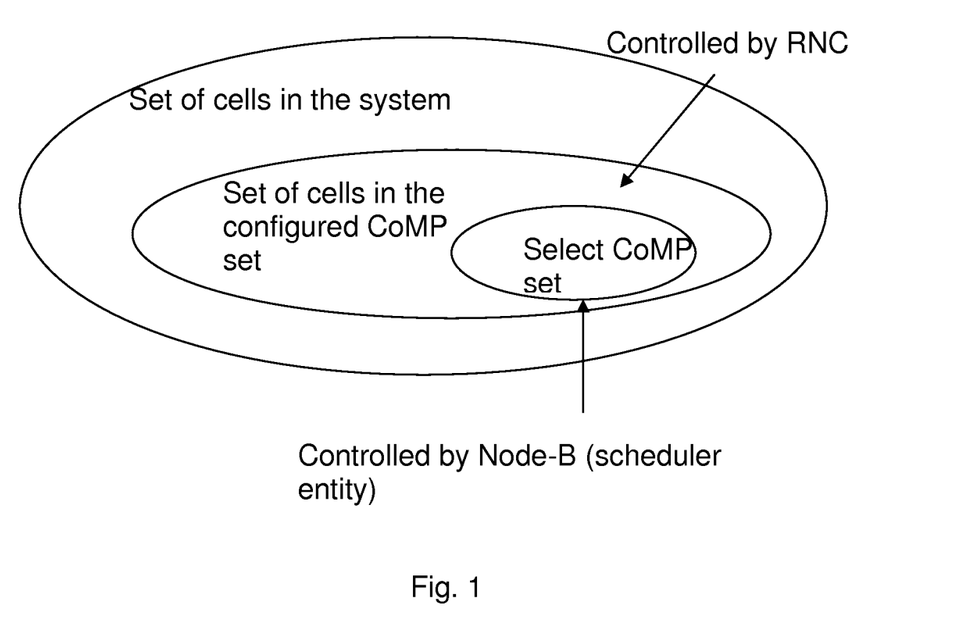
FIG. 1 is a view illustrating the relationship between the set of cells in the system, the configured CoMP set and the selected CoMP set.

In FIG. 1 a view illustrating the relationship between the set of cells in the system, the configured CoMP set and the selected CoMP set is shown. Thus, out of the cells in the system the RNC configures a CoMP set. From the configured CoMP set the Node B (for example) selects a selected CoMP set.

Figure 2:
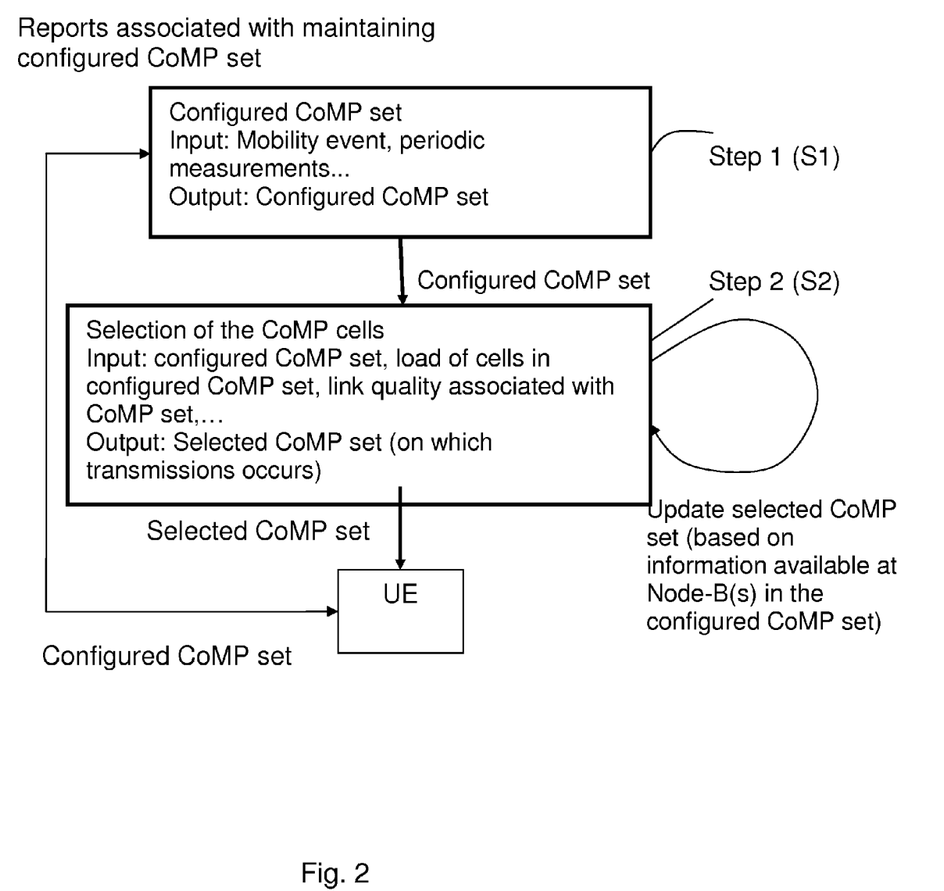
FIG. 2 is a flowchart illustrating some steps performed when selecting CoMP cells.

An overview of an exemplary method is shown in FIG. 2 which illustrates a decoupled method performed in two steps. The following subsections describe exemplary embodiments of the two steps in more detail.

Step 1: Maintaining the Configured CoMP Set

In a first step (S1), the RNC is configured to decide the configured CoMP set. The configured CoMP set can be signaled to both the UE and the Node-B(s) in the configured CoMP set or alternatively to a baseband unit associated with the configured CoMP set that controls the scheduling. This configured CoMP set can be signaled as a mapping between a number and the cell, such as: "1"—cell A; "2"—cell C; "3"—cell D . . . . The number can be used in High Speed Shared Control Channel (HS-SCCH) orders to inform the UE about which of the cells in the configured CoMP set that should serve as the secondary serving HS-DSCH cell at a given time-instance.

Figure 3:
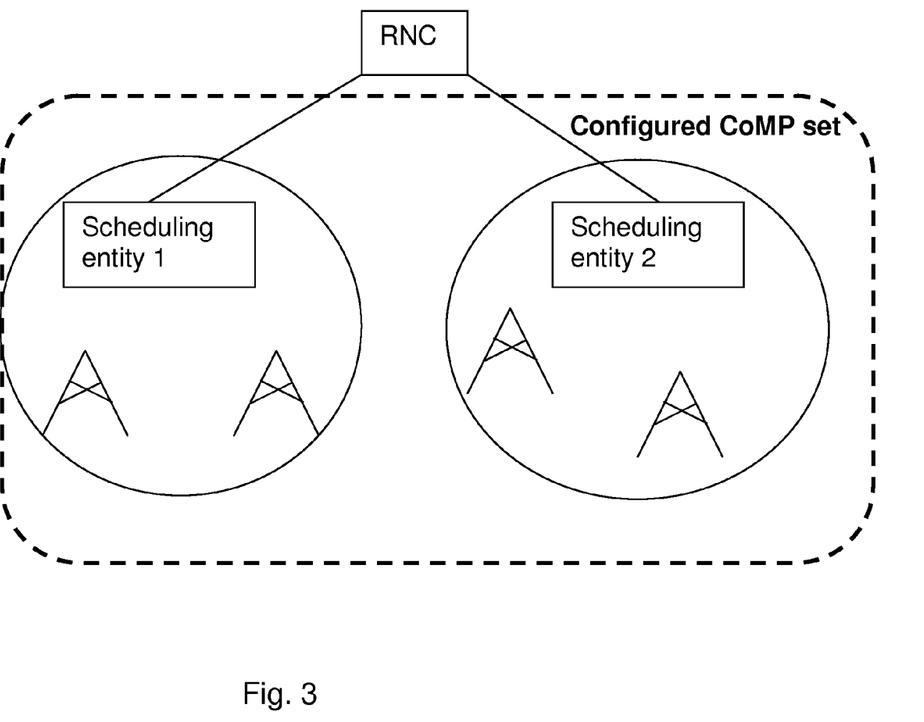
FIG. 3: illustrates a scenario where the configured CoMP set is composed of two disjoint scheduling entities.
Figure 4:
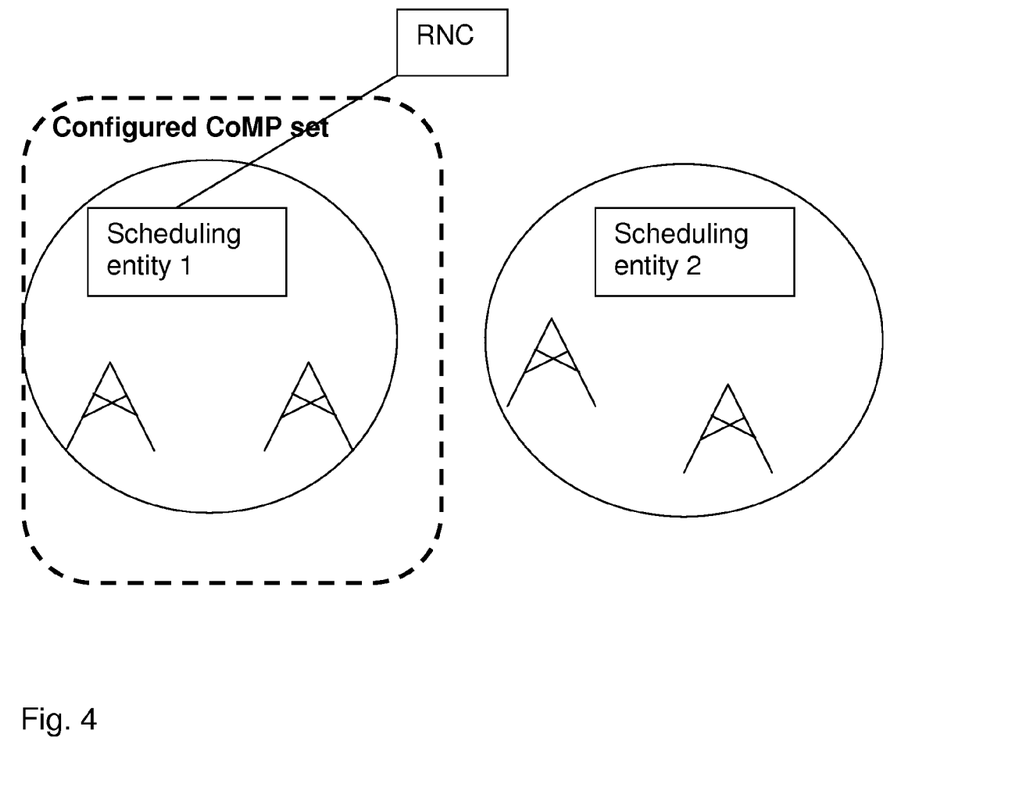
FIG. 4 illustrates a scenario where the configured CoMP set is composed of a single scheduling entity.
Figure 5:
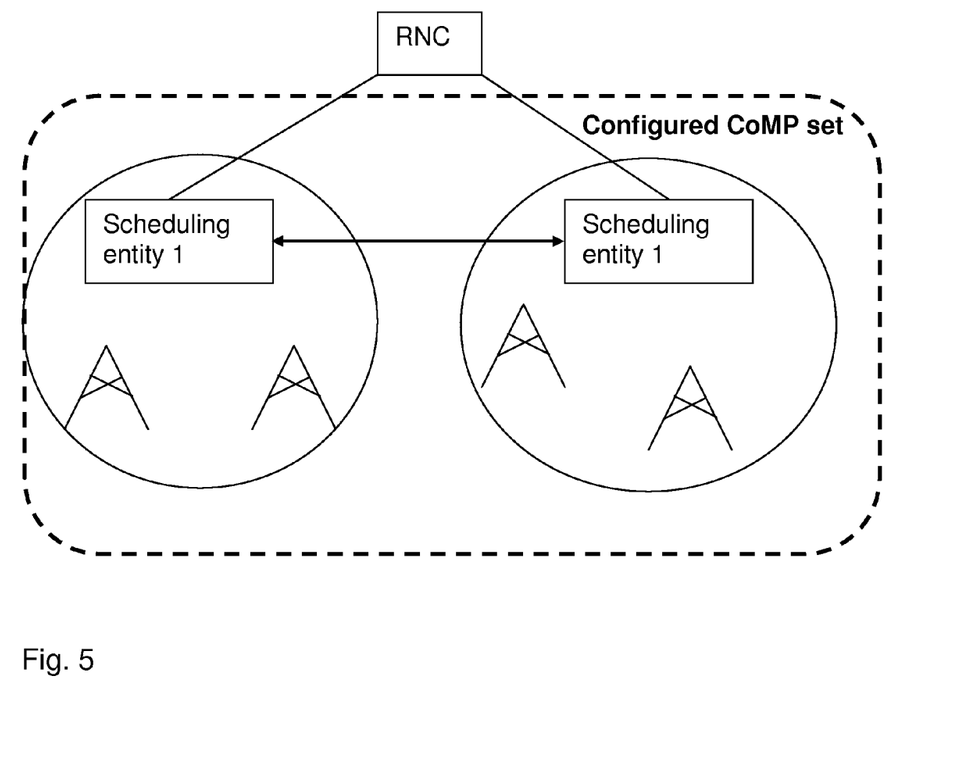
FIG. 5 illustrates of scenario where the configured CoMP set with a logical scheduling entity that is distributed across different cells.

In the configured CoMP set all cells in the set can be controlled by one (the same logical) baseband unit, which also can be termed "scheduling entity". By ensuring that the cells in a configured CoMP set are controlled by the same baseband unit either composed of a single scheduling entity, see FIG. 4 or a logical scheduling entity distributed across different cells, see FIG. 5, the RNC can ensure that:

It only needs to forward data to one scheduling entity (i.e., one Iub flow control is sufficient). If cells in the configured CoMP set were handled by disjoint scheduling entities (that were not able to communicate with each other without RNC involvement), the RNC would have to split the downlink data between the two entities. This is illustrated in FIG. 3.

Layer 1 (L1) HS-SCCH orders for activating and deactivating secondary serving HS-DSCH cell(s) are supported without requiring any RNC involvement. Note that for downlink transmissions the activation status of the secondary serving HS-DSCH cells is unknown to the RNC in existing releases (Rel-8 to Rel-10). Note further that the usage of HS-SCCH orders for activating and deactivating secondary serving HS-DSCH cells are not possible if the cells in the configured CoMP set are handled by disjoint scheduling entities. This is because the RNC, depending on the activation status of the configured secondary serving HS-DSCH cells, would have to schedule data to different scheduling entities over Iub.

In order to continuously update the configured CoMP set, existing mobility measurements/reports can be reused. Note that the thresholds for reporting different events (e.g., Event 1a/b) can be set differently for managing the CoMP set and for the mobility purpose. As a complement to the event driven reports one could also rely on periodic reports.

To avoid an RNC congestion it is possible for the baseband unit, e.g. via the serving Node-B(s), to activate and deactivate reporting to the RNC associated with the maintenance of the configured CoMP set. This can be signaled, e.g., by means of L1 HS-SCCH orders. To increase the probability that the UE is capable of successfully receiving the HS-SCCH order, the order can in accordance with some embodiments be transmitted from the serving Node-B. By introducing the capability for the Node-B to dynamically activate and deactivate the RRC reporting associated with configured CoMP set the baseband unit responsible for the cells in the configured set can Disable reports transmitted from the UE to the RNC regarding addition/deletion of new cells if the cells are characterized by high load conditions.

Disable reports transmitted from the UE to the RNC regarding addition/deletion of new cells if the RNC is experiencing congestion. This may require that new signaling is introduced from the RNC to the baseband unit responsible handling the configured CoMP set.

Step 2: Decision of the Selected CoMP Set

Given the configured CoMP set as determined in Step 1 (S1), the baseband unit responsible for the cells in the configured CoMP set can dynamically decide which of the cells in the configured CoMP set that it should use for data transmissions. To prioritize amongst the cells in the configured CoMP set, the following information can be used:

The radio quality of the link

This can be based on uplink measured (filtered) Dedicated Physical Control Channel (DPCCH) quality. If the measured DPCCH quality of two links is determined to have a large difference this means that the average link quality associated with the two cells are different. This in turn means that the gains from multipoint transmission techniques are limited.

The Channel Quality Indicator (CQI) information associated with the configured CoMP set. If the UE reports CQI information for all cells in the configured CoMP set then the reported CQI information can be used for evaluating the difference in link quality between different cells.

Uplink power headroom (UPH). The UPH can be used to determine whether or not a UE is close to a cell border. It could for example be used in a way so that the multi-point transmissions only is used for such UE; in this way the overall coverage can be increased.

The load associated with the cell (available power and code)

The estimated downlink (DL) throughput that a UE can achieve, or combinations of the above.

If there is no suitable cell can be selected or for some other reasons, the serving cell can disable DL CoMP as well.

Signaling from Node B to Inform UE the Secondary CoMP Ccell

The Node B can inform UE the selected secondary serving HS-DSCH cell by HS-SCCH order.

A new HS-SCCH order type can be defined for this purpose. And for this order type, three HS-SCCH order bits can indicate a cell number from 0 to 7 among 8 cells at most. The number is according to the mapping list signaled from RNC.

In particular, the serving cell can disable the DL CoMP operation by reusing the order type mentioned above by the means to set the order bits to a special value for example 000. To enable DL CoMP on the contrary, a cell number from 1 to 7 can be used to indicate the secondary serving cell among at most 7 cells.

UE Actions When Receiving the Secondary CoMP Cell Indication

When a UE receives the indication from Node B about a secondary serving HS-DSCH cell, the UE can take action according to different HSDPA multipoint transmission scheme. For SF-DC-HSDPA, the UE can report CQIs of both cells separately and reuse the HS-DPCCH format for DC-HSDPA; for High Speed—Single Frequency Network (HS-SFN), the UE may need to report one combined CQI according to the combined channel estimation.

By using the methods and devices as described herein, the secondary serving HS-DSCH cell can be selected by Node B in a quick way and the load information of each cell can be taken into account.

Figure 6:
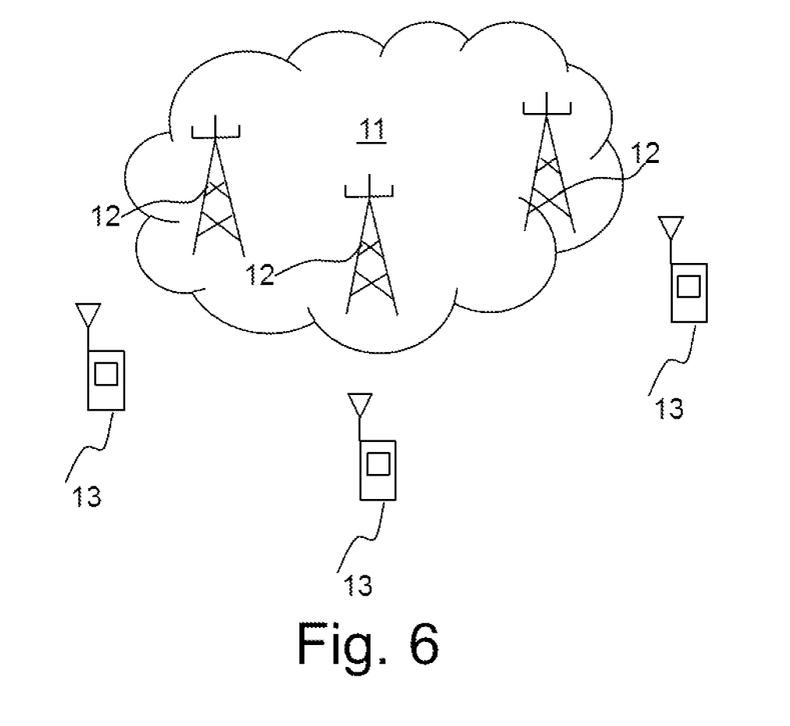
FIG. 6 illustrates an exemplary cellular radio network.

Although the described solutions may be implemented in any appropriate type of telecommunication system supporting any suitable communication standards and using any suitable components, particular embodiments of the described solutions may be implemented in a network such as that illustrated in FIG. 6.

As shown in FIG. 6, the example network 11 may include one or more instances of user equipment (UEs) 13 and one or more base stations 12 capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 7. Similarly, although the illustrated base stations may represent network nodes that include any suitable combination of hardware and/or software, these base stations may, in particular embodiments, represent devices such as the example base station illustrated in greater detail by FIG. 8.

Figure 7:
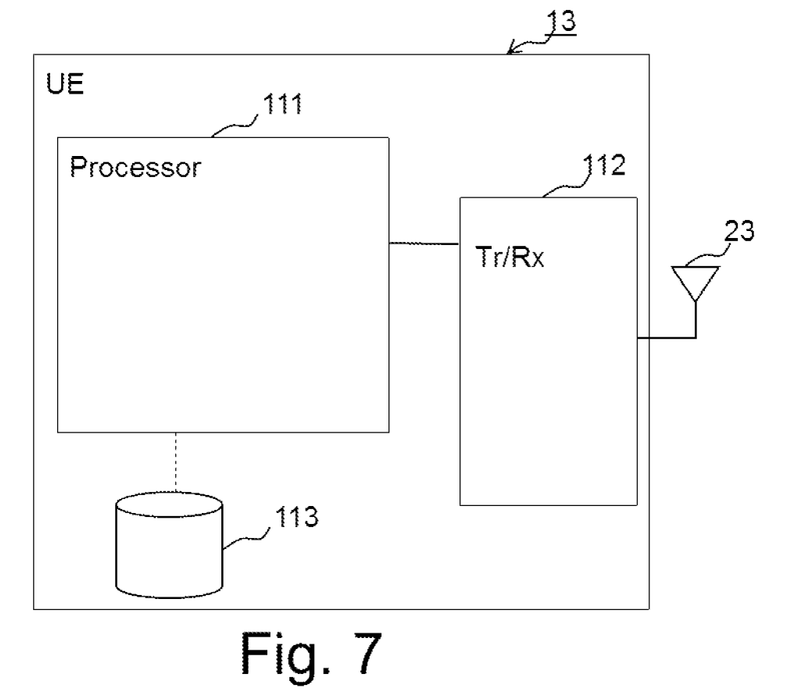
FIG. 7 illustrates an exemplary user equipment.

As shown in FIG. 7, the example UE 13 includes a processor 111, a memory 113, a transceiver 112, and an antenna 23. In particular embodiments, some or all of the functionality described above as being provided by mobile communication devices or other forms of UE may be provided by the UE processor 111 executing instructions stored on a computer-readable medium, such as the memory 113 shown in FIG. 7. Alternative embodiments of the UE may include additional components beyond those shown in FIG. 7 that may be responsible for providing certain aspects of the UE's functionality, including any of the functionality described above and/or any functionality necessary to support the solution described above.

Figure 8:
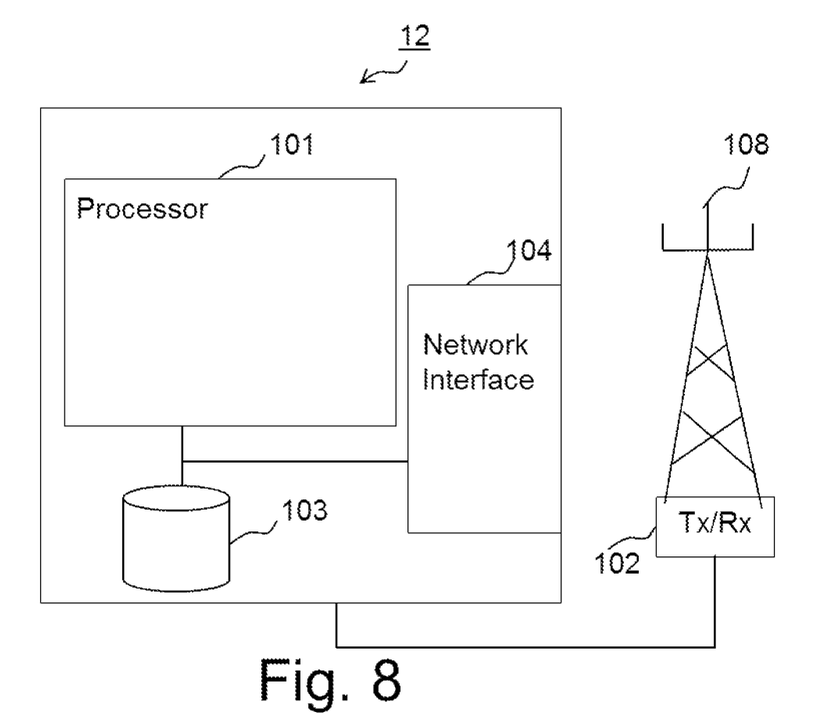
FIG. 8 illustrates an exemplary radio base station.

As shown in FIG. 8, the example base station 12 includes a processor 101, a memory 103, a transceiver 102, and an antenna 108. The example base station can also comprise a network interface 104. In particular embodiments, some or all of the functionality described above as being provided by a base station, a base station controller, a node B, an enhanced node B, and/or any other type of mobile communications node may be provided by the base station processor executing instructions stored on a computer-readable medium, such as the memory shown in FIG. 8. Alternative embodiments of the base station may include additional components responsible for providing additional functionality, including any of the functionality identified above and/or any functionality necessary to support the solution described above.

The invention claimed is:

1. A method, in a baseband unit that is associated with a set of cells configured by a radio network controller (RNC) for simultaneous multipoint transmission of possibly different data to the same User Equipment (UE), comprising:
    receiving signaling identifying the configured set of cells from the RNC, wherein said baseband unit comprises one or more entities that perform scheduling for the configured set of cells;
    determining a subset of cells from said configured set of cells that are to be used for actual data transmission to the UE, based on considering a set of information that is not known to the RNC, wherein determining the subset of cells comprises making dynamic decisions based on at least one of the following items of information in said information set for one or more of the cells in the configured set of cells: loading, variation in the loading over time, maximum available transmit power, and loading on different carriers;
    dynamically transmitting or controlling the transmission of data to the UE from the subset of cells;
    receiving signaling from the RNC updating the configured set of cells and correspondingly determining whether and in what manner to revise the subset of cells that are to be used for actual data transmission to the UE; and
    signaling to the UE, via a radio node serving the UE, to deactivate sending of reports from the UE to the RNC regarding addition/deletion of new cells in the configured set of cells, if the cells are characterized by high load conditions or if the RNC is experiencing congestion.

2. The method of claim 1, wherein determining the subset of cells comprises making dynamic decisions based on an uplink radio quality in said information set for one or more of the cells in the configured set of cells.

3. The method of claim 1, wherein receiving signaling identifying the configured set of cells from the RNC comprises receiving a mapping between numbers and cells.

4. The method of claim 1, further comprising sending signaling, for indicating the subset of cells to the UE.

5. A baseband unit for use in a cellular radio network that is configured for multipoint transmission, wherein a radio network controller (RNC) in said network determines a configured set of cells that can be used for simultaneous transmission of possibly different data to the same User Equipment (UE), said baseband unit comprising:
    a communication interface configured to receive signaling from the RNC that indicates the configured set of cells; and
    a processing circuit configured to:
        determine a subset of cells from said configured set that are to be used for actual data transmission to the UE, based on considering a set of information that is not known to the RNC, wherein the processing circuit is configured to select which cells from the configured set to include in the subset of cells, based on considering, as said set of information, any one or more of the following items for one or more of cells in the configured set of cells: loading, variation in loading over time, maximum available transmit power, and loading on different carriers;

dynamically transmit or control transmission of data to the UE from the subset of cells;

receive signaling from the RNC updating the configured set of cells and correspondingly determine whether and in what manner to revise the subset of cells that are to be used for actual data transmission to the UE; and signal to the UE, via a radio node serving the UE, to deactivate sending of reports from the UE to the RNC regarding addition/deletion of new cells in the configured set of cells, if the cells are characterized by high load conditions or if the RNC is experiencing congestion, wherein said baseband unit comprises one or more entities that perform scheduling for the configured set of cells.

6. The baseband unit of claim 5, wherein the processing circuit is configured to select which cells from the configured set to include in the subset of cells, based on considering, as said set of information, any one or more of the following items for one or more of cells in the configured set of cells: uplink radio quality and or downlink throughput.

7. The baseband unit of claim 5, wherein said signaling received from the RNC indicates a mapping between numbers and cells, and wherein the processing circuit is configured to identify the configured set of cells by interpreting the mapping.

* * * * *